INVENTOR.
Charles Carlson

INVENTOR.
Charles Carlson

April 13, 1954  C. CARLSON  2,675,038
METHOD AND APPARATUS FOR FORMING VENEER PATCHES
Filed May 22, 1950  5 Sheets-Sheet 3

INVENTOR.
Charles Carlson
BY
Atty.

INVENTOR.
Charles Carlson

April 13, 1954     C. CARLSON     2,675,038
METHOD AND APPARATUS FOR FORMING VENEER PATCHES
Filed May 22, 1950     5 Sheets-Sheet 5

INVENTOR.
Charles Carlson
BY
Atty.

Patented Apr. 13, 1954

2,675,038

UNITED STATES PATENT OFFICE 2,675,038

METHOD AND APPARATUS FOR FORMING VENEER PATCHES

Charles Carlson, Vancouver, Wash.

Application May 22, 1950, Serial No. 163,556

5 Claims. (Cl. 144—309)

1

This invention relates to a method of patching plywood, and has for one object thereof the provision of a method of forming a veneer patch for use in patching plywood.

Another object of my invention is the provision of a veneer patch having an elliptical outline, the corners of which are rounded for use in patching a hole of complementary outline formed in one ply of a piece of plywood.

It is common, in the Pacific Northwest Douglas fir plywood industry, to patch plywood to a depth of one ply with boat-shaped patches. Such patches replace the natural defects such as knots, pitch pockets, unequal surfaces, and unbroken spaces, found in all veneer sheets. These defects must be cut from the outermost plies of a piece of plywood and replaced by a patch free from defects if the finished product is to present an unblemished surface. Accordingly, the plywood industry has developed a method for removing the defects from a sheet of veneer by cutting a sharp pointed boat-shaped hole with a router knife and filling the hole with a complementary sharp pointed patch. The router knife thus employed cuts the hole on a bevel and the patch used to fill the hole is also cut on a bevel. The patch itself is formed on a semiautomatic machine, the main elements of which are two dish saws. A strip of veneer eight to twelve feet in length is fed into this machine. The dish saws reciprocate vertically, one at a time in an arc, so that first one side of the long pointed boat-shaped patch is cut by a moving saw and thereafter the other saw descends and cuts the other side of the said patch. The dish saws thus employed are mounted to descend in an arc so that the sides of the patch will be cut on a bevel corresponding to the bevel formed in the complementary hole by the router knife. Thus, the method of patching a piece of plywood which consists of the manipulative steps of forming a beveled hole one ply in depth in a plywood sheet, forming a sharp pointed beveled veneer patch of complementary outline, and pressing the said patch into the said hole is well known to the plywood industry and will be hereinafter referred to as the prior art method of patching a piece of plywood. Among the disadvantages I have encountered while practicing the prior art method of patching plywood, may be listed the loose, structurally weak, bond between the veneer patch and the hole, as well as the splintering and feathering of the edge of the beveled hole caused in the formation thereof by the router knife. Accordingly, it is an object of my invention and within the scope thereof to form

2 a plywood patch hole without splintering or feathering the uppermost ply thereof and, further, to press a beveled patch into a nonbeveled hole, thereby securing a tight fit and increasing the structural strength of the finished patch.

One of the objects of my invention is to provide a beveled edged, flat, veneer patch having an elliptical outline with rounded corners, the principal axis of which is formed with the wood grain.

Another object of my invention is to provide a method for patching plywood, the manipulative steps of which include forming a nonbeveled hole of one ply depth in a plywood sheet, forming a beveled veneer patch of complementary outline, applying to the patch a thermosetting adhesive resin, pressing the resinated patch into the hole while at the same time heating the patch to set the adhesive resin, and leveling, as by sanding, the set patch to provide a smooth exterior finished surface.

Still another object of my invention is to provide a method for forming a veneer patch, the manipulative steps of which include providing an elliptical pattern with rounded corners, moving a beveled cutting head through a sheet of veneer in a path defined by the periphery of the said elliptical pattern, varying the velocity of movement of the cutting head so that it moves more slowly across the grain than it does with the grain, removing sawdust as the same is formed, and holding the patch thus formed against movement during the terminal portion of the cutting head moving step.

These and other objects and advantages of my invention are hereinafter described with reference to the accompanying drawings, in which.

Figure 7:
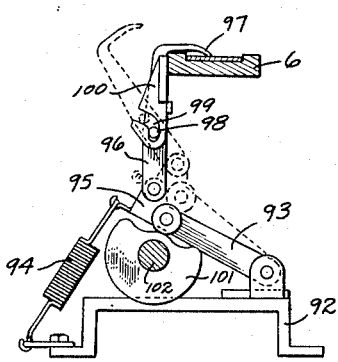
Figure 8:
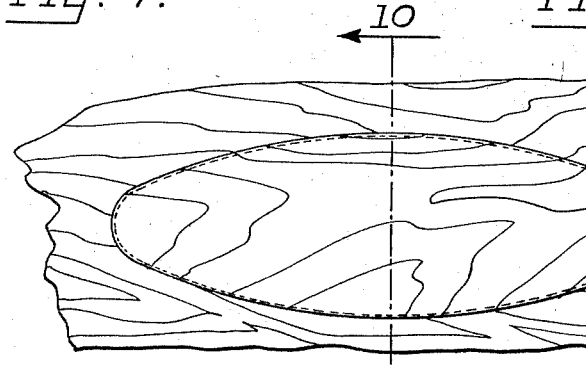
Figure 9:
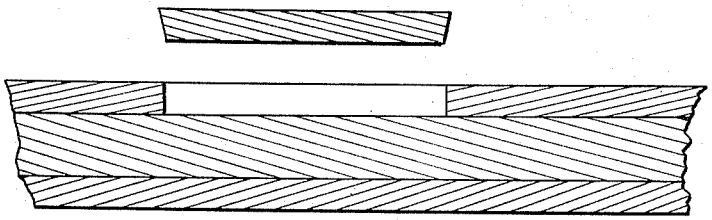
Figure 10:
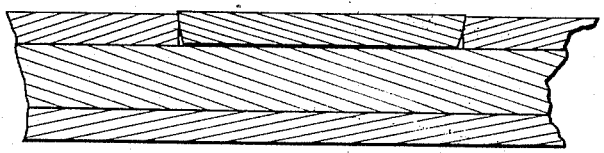

Fig. 7 is a detail view disclosing the holding means by which the veneer patch of my invention is held to the work table after the patch is approximately 60% formed; and Figs. 8, 9 and 10 are related views illustrating a nonbeveled hole in the top ply of a piece of plywood, the beveled elliptical patch of my invention, and the way in which the beveled patch is fitted to the nonbeveled elliptical hole to patch the plywood. Fig. 10 is taken substantially on the line 10—10 of Fig. 8 and illustrates the position of the veneer patch prior to the manipulative step in which I sand the patch surface.

Figure 1:
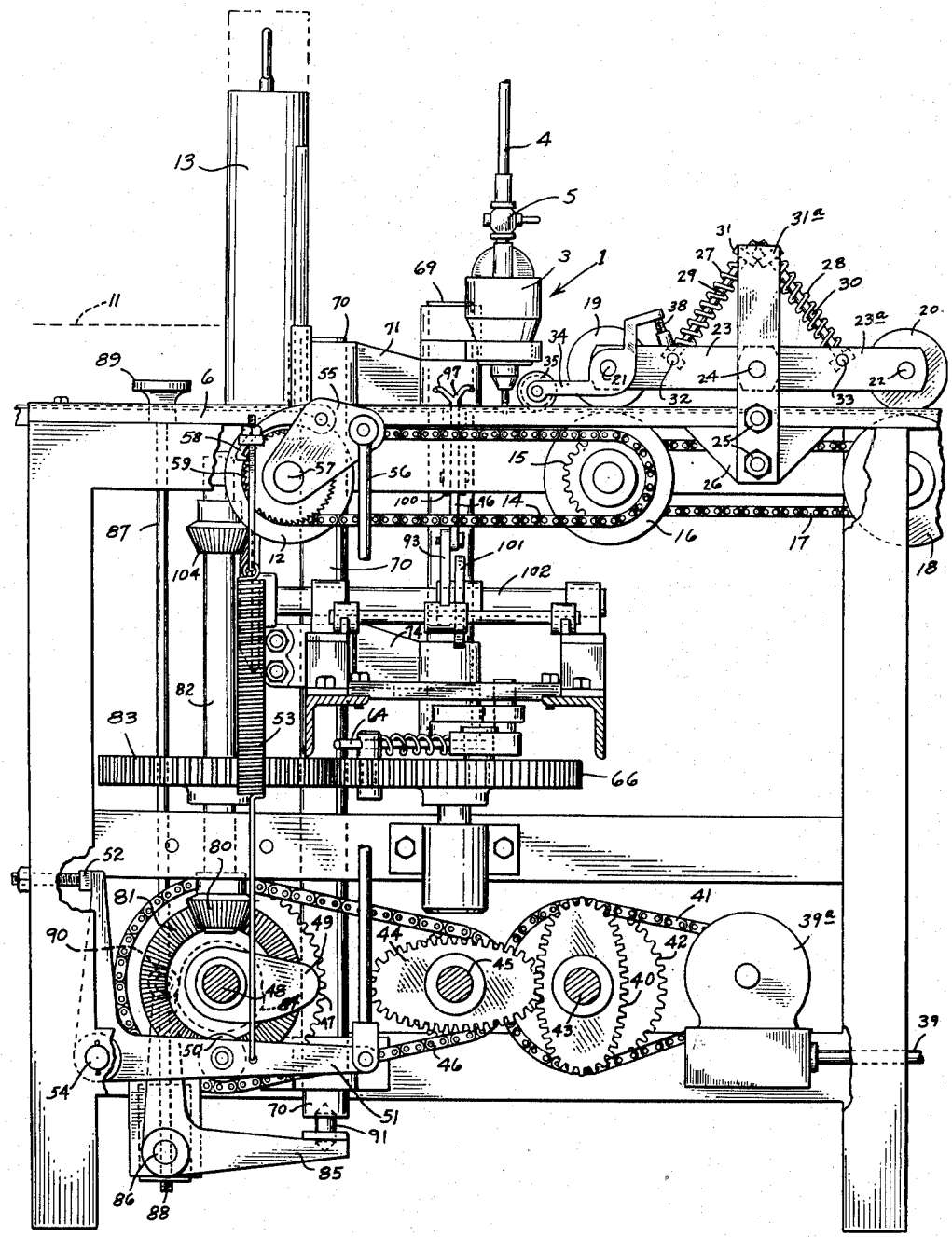
Fig. 1 is a front view, partially broken away, of the automatic machine employed to form the veneer patches used in the practice of my invention.
Figure 2:
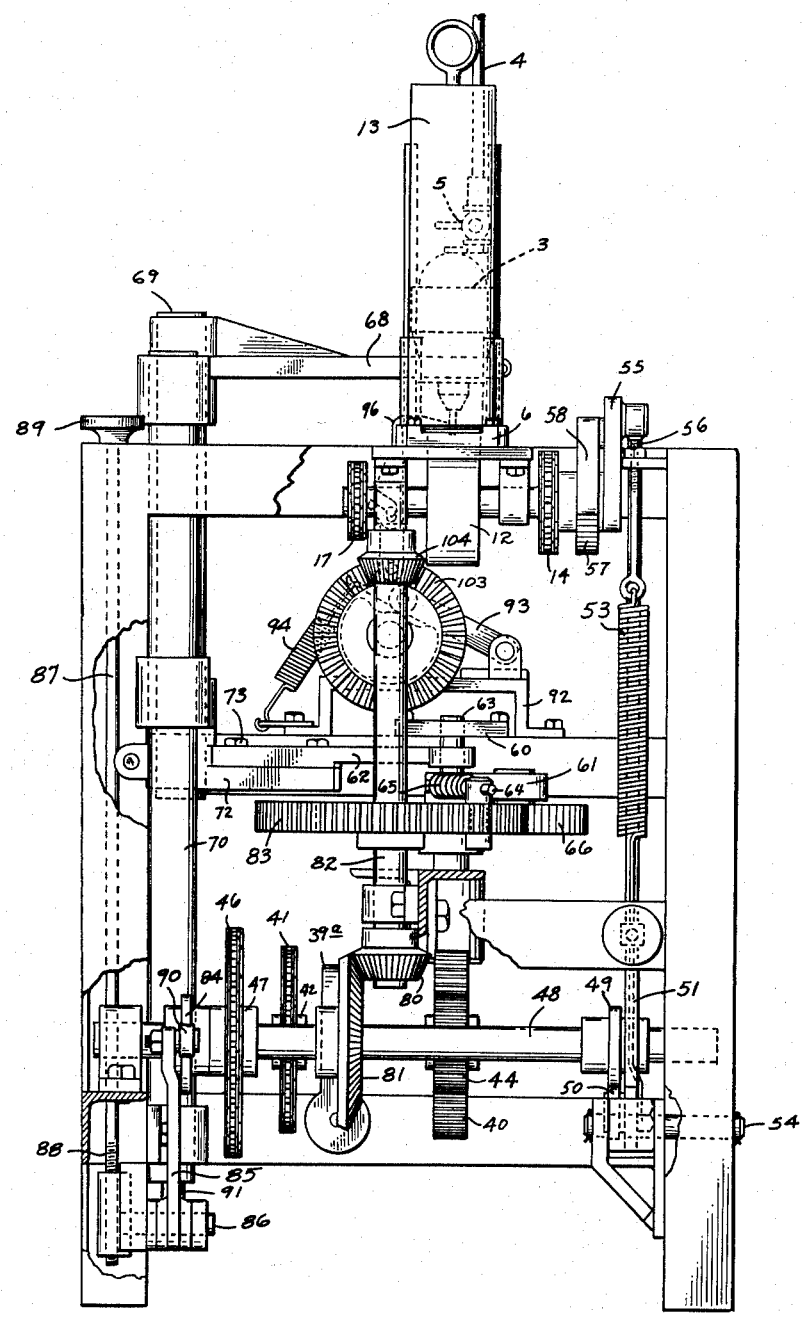
Fig. 2 is an end view, partially broken away, taken from the left end of the machine as shown in Fig. 1 and more particularly disclosing certain operative elements of the said automatic patch forming machine.
Figure 3:
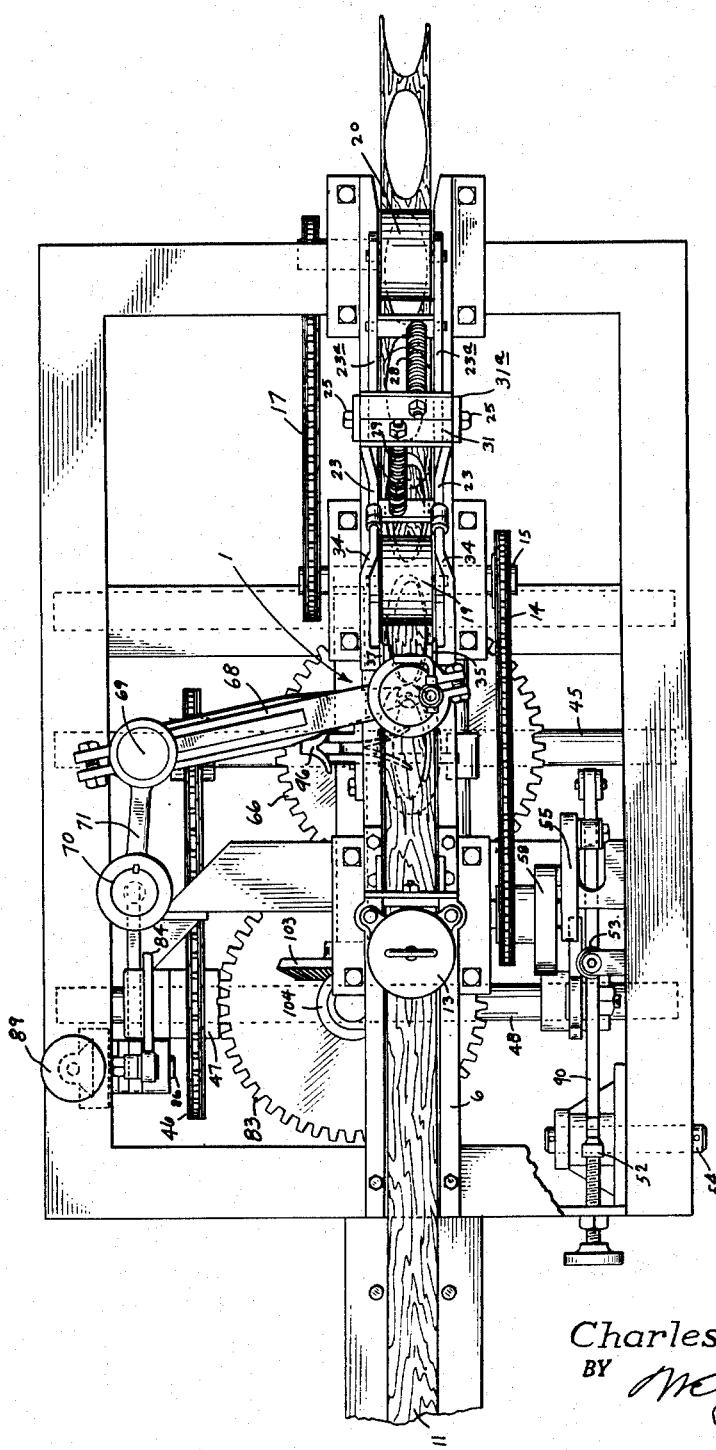
Fig. 3 is a top view, also partially broken away, of the patch forming machine disclosed in Figs. 1 and 2 and shows a strip of veneer being processed into patches by the machine.

The practice of the method of my invention demands that an accurate elliptical veneer patch, such as is shown in Figs. 8, 9 and 10 of my drawings, be employed to patch plywood. To the end that these veneer patches may be formed continuously and accurately on an automatic machine requiring a minimum of human attention, I have provided a router patch forming machine as shown in Figs. 1, 2 and 3 of my drawings. This machine, which, in actual practice, occupies a space about one-half as extensive as that occupied by an ordinary office desk, employs a pneumatic air motor to drive a cutting head or router at a speed of approximately 40,000 R. P. M. In Fig. 1 of my drawings, the router is generally designated by the numeral 1 and comprises a cutting head 2, a pneumatic motor 3, and an air hose 4 for supplying the pneumatic motor. During the periods in which my router machine is set for automatic continuous operation, the pneumatic motor 3 is also in continuous operation to cause the cutting head 2 to rotate at a constant speed. To shut the motor off, however, when it is not in use, I provide an air valve 5 between the air hose 4 and the pneumatic motor.

The main work table employed by my router consists of a perforated horizontal metal table 6 (see Fig. 5) with a recessed portion into which is fitted a perforated wood block 7 secured as by screws 8 thereto. The perforations through the metal work table 6 and the wood block 7 are coaxial and form sawdust vent ports 9 leading to an evacuated low pressure air box 10. This air box 10 is maintained at a reduced pressure by means of an air evacuation pump (not shown) in order that sawdust will be sucked thereinto through the sawdust vent ports 9 as quickly as it accumulates upon the work table and wood block.

The patch forming router machine employed to practice my invention is automatically fed eight-foot strips of veneer from a pile of strips placed on the left end thereof as shown in dashed lines at 11 in Fig. 1. This pile is held in contact with dual feed rollers 12 by means of a weight 13 which bears upon the top of the pile (see the dashed line weight position in Fig. 1). The dual feed rollers 12 are linked, as by a chain-and-sprocket drive 14 and 15, to a second pair of feed rollers 16. These feed rollers, in turn, are linked by a similar chain-and-sprocket drive 17 to a third pair of feed rollers 18. The latter two sets of feed rollers, namely 16 and 18, coact respectively with two dolly rollers 19 and 20. The two dolly rollers are axled respectively at 21 and 22 on a pair of relatively moveable transverse frame members 23 and 23a. These frame members, in turn, are joined for rotation relative to one another at 24 and are secured to the metal work table by bolts and angle irons 25 and 26 respectively. A constant downward pressure is maintained on each of the dolly rollers 19 and 20 by means of two compression springs 27 and 28 wrapped about two rods 29 and 30 respectively and secured between two lateral fastener members 31, 31a and bearing pins 32 and 33 respectively. Thus, a veneer sheet in position on the metal work table 6 is, at all times, compressed between the dolly rollers and the feed rollers for accurate longitudinal movement through the patch forming machine. As best shown in Figs. 1, 3 and 5, the dolly roller frame members 23 also carry a pair of adjustable arms 34 to which are rotatably secured a pair of flanged wheels 35 and 37. Each of the flanged wheels 35 and 37 has a beveled flange face 36 (see Fig. 4) for cooperation with the identical flanged wheel located opposite thereto. The two flanged wheels 35 and 37 serve the purpose of centering the veneer sheet upon the work table as the sheet is fed through the router machine. The arms holding these flanged wheels are adjustably mounted, as at 38, so the wheels may be accurately positioned with respect to the veneer sheet in order to center the sheet therebetween yet not crush the edges thereof.

In order to alternately advance and hold in place the veneer sheet employed as raw material by my router, I have provided an intermittent drive for the feed rollers 12, 16, and 18. This intermittent drive originates with a constant speed shaft 39 (driven by an electric motor not shown) which drives an elliptical gear 40 through a chain and sprocket 41 and 42 and a worm gear reduction box 39a. The gear into which the sprocket 42 is cut and the elliptical gear 40 are mounted for integral rotation about an axle 43. The elliptical gear 40 meshes with a companion elliptical gear 44 mounted upon an axle 45 so that a constant rotary imput into the axle 43 impresses an intermittent or slow and fast rotary movement upon the axle 45. The chain 46 revolves with the axle 45 to transfer a similar intermittent motion to the sprocket 47. Fig. 2 best illustrates the manner in which the intermittent motion of the sprocket 47 is, in turn, transferred to a laterally disposed main drive axle 48. This main drive axle 48 has, keyed thereto, an eccentric cam 49 (see Fig. 1) which actuates a cam follower 50. The cam follower 50, in turn, is rotatably mounted upon a cam follower arm 51 formed in the shape of a bell crank lever. The upper portion of the cam follower arm 51 is held against an adjustable stop 52 by a large tension spring 53 and is pivotally mounted on a cotter key secured pin 54. The opposite or lower end of the bell crank shaped follower arm is linked to a triangular pawl actuator 55 by a long vertical link 56. The pawl actuator 55 rotates about an axle 57 and, in turn, rotatably carries a pawl 58 for engagement with a ratchet 59. It is this ratchet 59 which is joined to the first feed roller 12 to cause the rotation thereof. Thus, the constant rotary speed initially imparted to the axle 43 is converted, by means of the elliptical gears 40 and 44, through the eccentric cam 49, and the pawl and ratchet 58, 59 into an intermittent stop and go motion for the feed rollers 12, 16, and 18.

Figure 6:
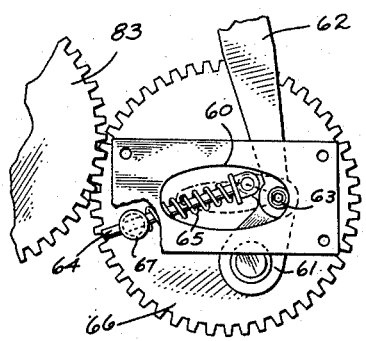
Fig. 6 is a detail view disclosing the elliptical metal pattern and follower arm by which the router cutting head of my invention is guided in its movement around an elliptical path.

The router cutting head 2 which I employ to form the elliptical patches with rounded corners as practised by my invention is made to follow an elliptical cutting path by means of an elliptical pattern 60 as shown in Fig. 6 of the drawings. In actual practice, each patch forming machine is supplied with a multiplicity of various sized patterns 60 so that various sized patches may be formed. Since an elliptical motion is best transferred from a pattern to an actuating arm by separating the elliptical motion into two component movements, translating the movements, and recombining them into an elliptical motion, I have provided for such a system in my invention. The component movements into which I break my elliptical motion are a rotation which I impose upon one transfer shaft and an oscillatory to and fro motion which I impose upon another transfer shaft. These two movements are then transmitted to a point of use where they are recombined to give an elliptical motion to the cutting head of my router. Fig. 6 best illustrates the means by which I separate the elliptical motion into two component movements. Thus, as therein shown, a rotary guide 61, journaled in the periphery of a large gear 66, and a follower 62 are both rotatably journaled to a pattern roller 63. The pattern roller 63 is caused to follow the peripheral outline of the elliptical pattern 60 by means of an arm 64 and a compression spring 65. One end of the arm 64 is pivotally joined to the pattern roller 63 via an extension on the rotary guide 61 and the other end of the arm 64 is secured to the periphery of a large gear 66 by means of a pierced carrier 67. In operation, the gear 66 is caused to rotate by a mechanism to be later described. As the gear 66 rotates, it carries with it the carrier 67, the rod 64, and the guide 61. This rotary motion causes the pattern roller 63 to trace along the peripheral outline of the elliptical pattern 60 and, once during each revolution of the large gear 66, a complete ellipse will be thus described.

The method by which I separate the universal motion of the follower 62 into two components of movement and later recombine the movements to impart to the cutting head an elliptical motion is best described with reference to Figs. 1, 2 and 3. In Fig. 3, the router 1 and the cutting head 2 are shown carried by a universal actuator arm 68. This actuator arm is shown journaled on a vertical rock shaft 69. The universal follower 62 (see Fig. 2) is correspondingly journaled to the vertical rock shaft 69 at the lower extremity thereof, as by a flange 72 and bolts 73, to give to the said universal actuator arm 68 one component movement of the elliptical motion previously described. The other component movement of the elliptical motion is one of pure rotation and is transmitted to the universal actuator arm 68 from a rock shaft 70 via a link 71. The link 71 is keyed to the rock shaft 70 for rotation therewith and is journaled to the vertical rock shaft 69 for rotation relative thereto. The component of rotational movement described by the follower 62 is separated therefrom by a link 74 (see Fig. 1) identical to the previously described link 71. Thus, the link 74 is keyed to the rock shaft 70 for rotation therewith and is journaled to the vertical rock shaft 69 for rotation relative thereto. From the foregoing description, it will be clear that the follower 62 and the universal actuator arm 68 are made to describe identical motions, elliptical in nature, by reason of the translatory movement component carried by the rock shaft 69 and the rotary movement component carried by the rock shaft 70. Thus, I have separated the elliptical motion of the pattern roller 63 into two component movements, translated the movements to a point of use, and recombined them into an elliptical motion at the router cutting head 2.

As previously set forth, one of the objects of my invention is to provide a method of forming a veneer patch in which one of the manipulative steps contemplates varying the velocity of elliptical movement of a router cutting head in direct proportion to the resistance encountered by the cutting head. That is to say, the sheets of veneer from which I form my patches are peeled from a log so that the grain of the wood runs the length of the veneer and, when patches are cut therefrom, the cutting head encounters less resistance when moving in the direction of the wood grain than it does when moving across the grain. I have found that if I attempt to trace the elliptical patch pattern at a uniform angular velocity, the veneer sheet exhibits a tendency to feather and splinter at the rounded corners as the cutting head moves across grain. Since this splintering and feathering is a disadvantage found in the prior art method of forming a veneer patch, my invention seeks to obviate the same. Accordingly, I vary or oscillate the angular velocity of movement of my cutting head as it moves along the elliptical cutting path so that the said velocity is relatively fast when the cutting head is moving with the grain of the wood and is relatively slow when the cutting head travels around the elliptical corners moving across the grain. The mechanism utilized to vary the angular tracing velocity includes a bevel gear 80 (see Fig. 1) driven by a second bevel gear 81 which is, in turn, secured to rotate with the main drive axle 48. The bevel gear 80 drives a vertical shaft 82, journaled in two frame cross members, to which shaft is secured a large gear 83 in operative mesh with the previously described gear 66. Since, as previously set forth, the sprocket 47 and main drive axle 48 move with an intermittent fast and slow motion impressed thereon by the two elliptical gears 40 and 44, the large gear 66 is also made to move in an intermittent fast and slow motion. It is the large gear 66, it will be remembered, which drives the pattern roller 63 to cause the router 1 to describe an elliptical path. Thus, when the sprocket 47 is moving with a relatively fast velocity, the two bevel gears 80 and 81 also move with a relatively fast velocity and the large gear 66 will move correspondingly. I have correlated the number of teeth on each of my gears so that this relatively fast velocity, which occurs twice during each complete revolution of the gears, takes place as the pattern roller 63 is moving longitudinally along the elliptical pattern. Correspondingly, the two periods of relatively slow motion are made to occur as the pattern roller 63 moves laterally along the end portions of the pattern 60. Feathering and splintering are thus overcome since the intermittent fast and slow movement of the pattern roller 63 is impressed upon the cutting head 2 as the latter accurately follows the patch dictated by the pattern roller. In one cycle of operation, during which the cutting head 2 describes a complete ellipse (see Fig. 4), the cutting head moves at a high angular velocity when traveling with the wood grain along one longitudinal side of the ellipse, moves slowly around the corner of the ellipse when traveling across the wood grain, again moves at a high angular velocity along the other longitudinal side of the ellipse, and, finally, moves slowly around the last corner of the ellipse to complete the pattern. I have made this manipulative step, namely that of varying the angular velocity of the cutting head in direct proportion to the resistance encountered with respect to the wood grain, within the scope of one object of my invention.

I have previously described how the router 1 is caused to describe an elliptical motion during the cutting operation by reason of two components of movement, one of which is a rotary movement of the rock shaft 70, the link 71, and the actuator arm 68. It is this rock shaft 70 which also vertically lifts the router 1 above the sheet of veneer while a new veneer area is being fed into place beneath the cutting head 2. Thus, after the cutting head 2 has completed one cycle of operation and has formed a complete elliptical patch, the feed rollers, 12, 16, and 18 cause the sheet of veneer to progress through the router machine a distance slightly exceeding the principal axis of one patch. The router 1 must be lifted vertically just prior to this feed motion, must be held clear of the veneer sheet while the feed movement takes place, and must be vertically lowered into position after the feed movement has been completed. I impress this lift, hold, and descend movement upon my router 1 by feeding the identical movements to the rock shaft 70 through the coaction of a cam 84 and a bell crank lever 85 (see Fig. 1). The bell crank lever 85 is adjustably mounted to pivot about an axle 86. Adjustment of the axle 86 takes place in a vertical direction and is provided by an adjustment rod 87, threaded at its lower extremity 88, and fitted at its upper extremity, adjacent the work table, with a knurled adjustment knob 89. The bell crank lever 85 is fitted at its upper end with a follower 90 and at its lower other end with a pivot pin 91. The pivot pin 91 fits between two complementary recesses located in the end of the bell crank lever 85 and the end of the rock shaft 70 to allow for the slight horizontal displacement which takes place between these two members when the bell crank lever rocks about the axle 86 and the rock shaft 70 moves in a vertical direction. Thus, since the cam 84 is driven from the main drive axle 48 and the follower 90 rides over the cam surface, when a high point on the cam is reached, the follower 90 causes the bell crank lever 85 to pivot about the axle 86 and lift the rock shaft 70 in a vertical direction. This vertical lift is, in turn, transmitted to the router 1 via the link 71 and actuator arm 68 causing the entire router, together with the cutting head therefore, to be lifted above the surface of the sheet of veneer. The router is thus held above the sheet of veneer so long as the cam 84 presents a high face to the follower 90. When the low face of the cam 84 again rotates into position beneath the follower 90, the rock shaft 70 and the router 1 again descend into operative position to form another veneer patch. Furthermore, the lift, hold, and descent motions of the router head are correlated to the progressive stop and go motions of the feed rollers, since both motions are derived from the main drive axle.

Figure 4:
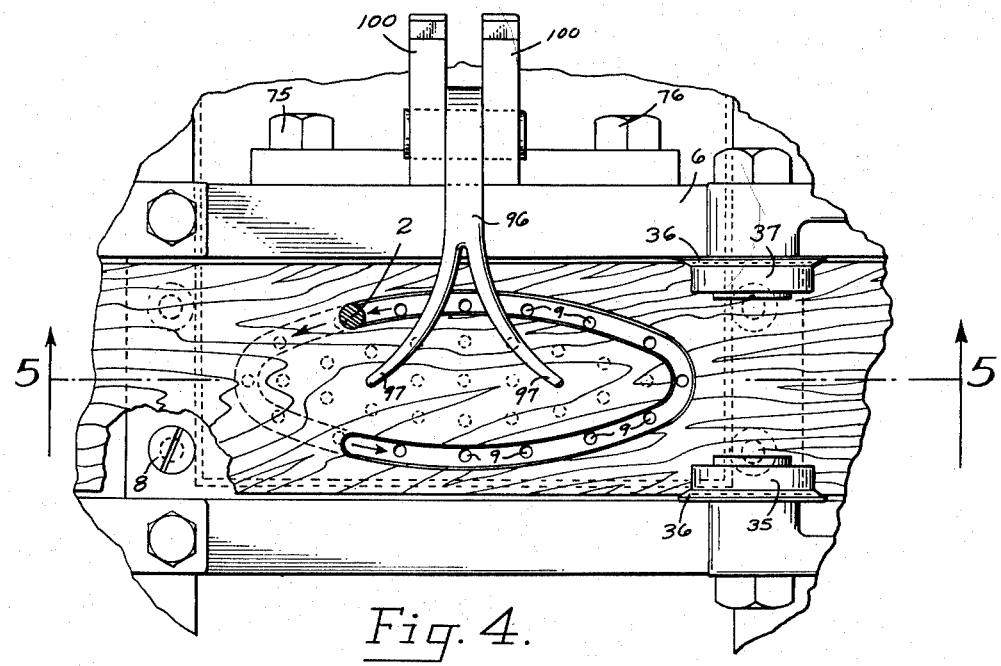
Fig. 4 is an enlarged detail top view, partially in section, taken on the line 4—4 of Fig. 5, and illustrating the work portion of the patch forming machine with a veneer patch in the process of formation.
Figure 5:
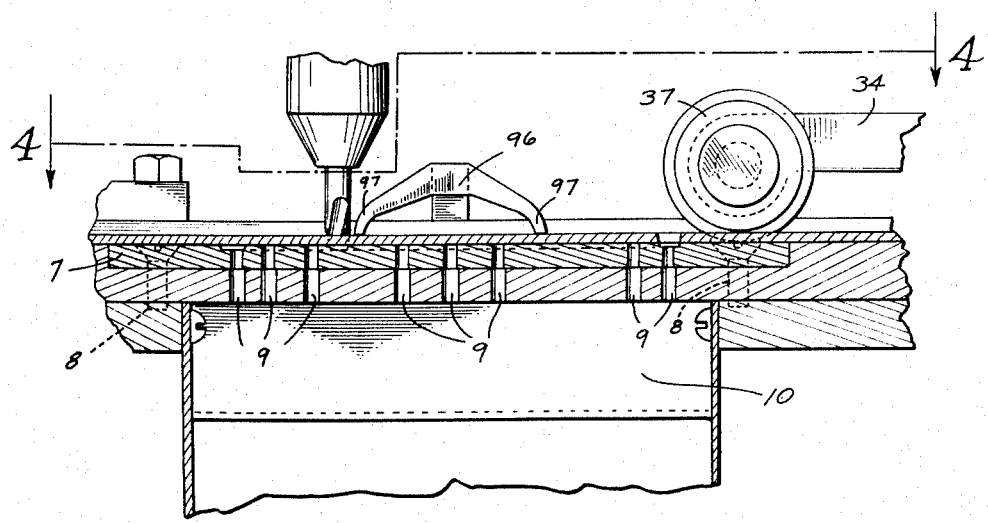
Fig. 5 is a detailed side view, partially in section, taken substantially on the line 5—5 of Fig. 4, and disclosing the vent means which I employ to remove the sawdust from the vicinity of a veneer patch as the same is being formed.

An inspection of Fig. 4 will reveal that, as the cutting head 2 completes the last portion of its movement along the elliptical path, the partially formed veneer patch is subject to movement and, therefore, must be held in place. That is to say, if the patch is not held against the perforated wood block in a secure manner, the patch will tend to move about as the cutting head completes its pattern. I have provided against such movement by two means. The first means comprises the sawdust vent ports 9 which, it will be remembered, are open to a low pressure air box 10. Thus, an area of low pressure is maintained about the lower face of the veneer patch and atmospheric pressure about the upper face thereof is caused to press the veneer patch into place. I have found, however, that such an atmospheric pressure holding means is insufficient by itself. Accordingly, I have provided another means to hold the patch in place. This means will be described with particular reference to Figs. 2, 4, and 7. In Fig. 7, I have shown a frame member 92 (adapted to be mounted on a main frame member, see Fig. 2) to which is pivotally secured a follower arm 93 and a tension spring 94. A triangular actuator piece 95 operatively secures the follower arm 93 and the tension spring 94 to a holding member 96, which holding member terminates in bifurcated fingers 97. The holding member 96 has, made integral therewith, a guide pin 98 adapted to slide in two mated L-shaped guide slots 99. The guide slots 99 are formed in guide members 100 which are secured to the metal work table 6 by bolts 75 and 76. A cam 101 is operatively connected to a longitudinal shaft 102 for rotation therewith to move the follower arm 93. The shaft 102 turns with the vertical shaft 82 (see Fig. 1) through mated large and small bevel gears 103 and 104, respectively. Thus, the intermittent motion of the main drive axle 48 is transmitted through the bevel gears 80 and 81 to the vertical shaft 82 and, thence, through the bevel gears 103 and 104 to the shaft 102. As the shaft 102 rotates with an intermittent motion, the cam 101 rotates accordingly. In Fig. 7, the holding member 96 and the bifurcated fingers 97 are shown, in the full line outline, in a holding position and, in the dashed line outline, out of holding relationship with the veneer patch. The full line holding position of the holding member 96 is assumed when the follower arm 93 rides on the low face of the cam 101. As the high face of the cam 101 revolves into position beneath the follower arm 93, the lower end of the holding member 96 is caused to move in a vertical direction upwardly as constrained by the guide pin 98 and the vertical portion of the L-shaped guide slots 99. This initial movement of the holding member 96 and the bifurcated fingers 97 is a vertical movement only. Further rotation of the cam 101 causes the follower arm 93 to move still higher and, moreover, to move the triangular actuator piece 95 slightly to the right. This latter movement causes the guide pin 98 to move upward and to the left in the L-shaped guide slots 99 to thereby pivot the top of the holding member 96 outwardly away from the work table and the veneer patch. The holding member 96 and the bifurcated fingers 97 are held away from the veneer patch during the remainder of the rotation of the cam 101. When the follower arm 93 again comes into contact with the lower face of the cam 101, the holding member 96 moves first toward the veneer patch and then down into holding position against the veneer patch by reason of the L-shaped guide slots 99 and the guide pin 98. Thus, during one revolution of the cam 101, the holding member 96 describes a lifting, a moving away, a holding, a moving toward, and a descending motion. I have correlated the revolution of my cam 101 to the movement of the router 1 in such a manner that the holding position is assumed (see Fig. 4) immediately after the cutting head 2 has passed a position directly in front of the bifurcated fingers 97. Thus, as represented by that portion of the cam 101 which is high, the cutting head 2 will trace approximately sixty per cent of its elliptical path before the bifurcated fingers 97 descend to hold the veneer patch in place.

In the operation of my veneer patch router, let it be assumed that a pile of veneer strips 11 are in place upon the left end of the work table 6 as seen in Fig. 1. These strips are fed one at a time, as required, from the bottom of the pile onto the perforated wooden block 7 beneath the router 1 by the feed rollers 12, 16, and 18. Each such sheet of veneer is, preferably, eight feet in length and is moved by the feed rollers in an intermittent stop and go movement, the go portion of which feeds the sheet forward a distance slightly exceeding the principal axis of one elliptical patch. This stop and go movement is instituted by means of the pawl 58 and the ratchet 59 which are operatively connected by the bell crank shaped cam follower arm 51 to the main drive axle 48 through the eccentric cam 49. With a sheet of veneer in place, the router 1 is caused to descend into place by the downward movement of the rock shaft 70 when the cam 84 presents a low face to the follower 90 on the bell crank lever 85. Thereafter, the rotating large gear 66 drives the pattern roller 63 about the periphery of the pattern 60 with an alternate fast and slow movement and the elliptical motion thus described is transmitted through the rock shaft 70 and the vertical rock shaft 69 to the cutting head 2. After the cutting head 2 has described approximately sixty per cent of one elliptical motion, the cam 101 presents a low face to the follower arm 93 and the holding member 95 swings forward and down so that the bifurcated fingers 97 hold the partially completed veneer patch tightly against the perforated wooden block 7. The cutting head 2 then completes the elliptical path and the bifurcated fingers are lifted up and back away from the patch. During this entire operation, the sawdust vent ports 9 have been drawing off the sawdust formed by the cutting head 2. The feed rollers 12, 16, and 18 now rotate, the veneer sheet is moved forward, the completed veneer patch drops through a hole in the work table, and the above described cycle of operations is repeated.

In my copending application entitled "Veneer Patch Router," filed May 22, 1950, Serial No. 163,555, now Patent No. 2,616,460, dated November 4, 1952, I have disclosed a machine for routing an elliptical shaped pattern from the top layer of a piece of plywood. The elliptical shaped pattern thus formed is not beveled and produces a hole similar to that shown in cross section in Fig. 9 of the instant drawings. For the purposes of the instant disclosure, the method by which the nonbeveled hole shown in Fig. 9 is formed is not critical and any well-known method may be used as, for example, the method of cutting the hole with a router knife. The method of patching a nonbeveled hole with a beveled veneer patch is, however, within the scope of one object of my invention. Accordingly, it should be noted that the hole of Fig. 9 is complementary in shape to the patch formed as previously described but is not beveled on the edges thereof, whereas the said patch is beveled. The method of patching a piece of plywood which comprises the steps of forcing a beveled veneer patch into a nonbeveled hole is believed to differentiate from the previously set forth prior art method which latter method fitted a beveled veneer patch to a beveled hole.

After the elliptical veneer patch of my invention is formed, I contemplate applying to the under surface thereof a thermosetting adhesive resin similar in nature to the adhesive resin commonly employed in the plywood industry to join sheets of veneer to form a plywood board. The resinated veneer patch is then placed in position in the complementary nonbeveled hole in the top layer of the piece of plywood. Since the bevel on the veneer patch is formed so that the middle circumference of the patch equals the uniform circumference of the hole, the patch will initially rest approximately half way down in the hole. Thereafter, a weighted foot with a heating element in the sole thereof is brought down on the top of the patch. This foot presses the patch firmly into the hole while, at the same time, heating the patch for a period of approximately three seconds to set the thermosetting adhesive resin. Thus, since the circumference of the top of the patch exceeds the circumference of the hole, the patch is forced into the hole, thereby producing a force fit. This force fit and the set of the thermosetting adhesive resin securely bond the patch into the hole and produce a plywood patch of superior strength. The last step in my method of patching a piece of plywood is that of leveling or sanding the patched surface so as to present a uniform, level, and smooth, finished surface. In the actual practice of the method of my invention, I have found that a piece of plywood so patched leaves but a thin, almost invisible, line about the periphery of the patch so that the patched portion of the plywood is almost unnoticeable. Furthermore, the method which I employ to patch plywood produces a structurally superior patch, since the edge of the patch, as well as the bottom surface thereof, is bonded to the plywood.

In accord with the objects of my invention, it will be seen that I have provided a bevel edged, flat, veneer patch having an elliptical outline with rounded corners, the principal axis of which is formed with the wood grain. Furthermore, I have disclosed a method for patching plywood in which the manipulative steps include forming a nonbeveled hole in a plywood sheet, forming a beveled veneer patch of complementary outline, applying a thermosetting adhesive resin to the patch, pressing the resinated patch into the hole while, at the same time, heating the patch to set the adhesive resin, and leveling or sanding the set patch to provide a smooth exterior finished surface. The method by which I form my patch includes the steps of providing an elliptical pattern with rounded corners, moving a beveled cutting head through a sheet of veneer in a path defined by the periphery of said elliptical pattern, varying the velocity of the movement of the cutting head so that it moves more slowly across the grain than it does with the grain, removing sawdust as the same is formed, and holding the patch thus formed during the terminal portion of the moving step.

I claim:

1. In a method for forming an elliptical wood patch, the steps of providing a pattern having an elliptical opening therein, tracing the boundary of said elliptical opening with an elliptical movement, breaking said elliptical tracing movement into two separate components of pure rotation and pure oscillation, translating said rotation and oscillation components separately to a point of use adjacent a piece of wood, providing a router at said point of use for cutting said wood, recombining said components at said router to move the latter through said wood in formation of an elliptical wood patch.

2. In a method for forming an elliptical wood patch, the steps of providing an elliptical pattern, tracing said elliptical pattern with two simultaneous component movements, translating said component movements separately to a point adjacent a piece of wood, providing a router adjacent said wood, combining said component movements at said router to cut an elliptical pattern through said piece of wood, and varying the speed of said tracing step in a predetermined sequence and cycle in accord with the elliptical movements of said router for slow movement across the wood grain and fast movement with the grain.

3. In combination with a router, an elliptical pattern, follower means for generating an elliptical movement by tracing said pattern, two separately mounted translating means both joined to said follower, means for separating said elliptical movements into rotational and oscillatory components and other means for translating said components to a point of use, and means joined to said router at said point of use said three preceding means being operatively joined together, for recombining said components and guiding the router in accord with the recombined movement.

4. In combination with a router, an elliptical pattern having a major and a minor axis, follower means for tracing said pattern with an elliptical movement, speed change devices operating in a predetermined sequence and cycle for varying the speed of said follower means tracing for slow movement along the major axis end portions of said elliptical pattern and fast movement along the minor axis sides thereof, and means joined to said router and follower means for guiding the router in accord with the varied elliptical movement traced by said follower.

5. In combination with a router for cutting an elliptical patch, an elliptical pattern spaced from said router, follower means for generating an elliptical movement by tracing said pattern, means interconnecting said follower means and router for moving said router in accord with said elliptical tracing movement, and hold down means having operating connections with the interconnecting means for moving it into seating position after a majority of said tracing movement is completed to grip the partially formed work and hold it against movement, said operating connections removing said hold down means from work gripping position at all other portions of said tracing movement.

References Cited in the file of this patent
UNITED STATES PATENTS

| Number | Name | Date |
|---|---|---|
| 55,006 | Dane | May 22, 1866 |
| 293,726 | Fancher | Feb. 19, 1884 |
| 354,997 | Albee | Dec. 28, 1886 |
| 856,767 | Colvin | June 11, 1907 |
| 1,629,595 | Steger | May 24, 1927 |
| 1,647,969 | Long | Nov. 1, 1927 |
| 1,798,926 | Black | Mar. 31, 1931 |
| 1,839,196 | Cameron | Jan. 5, 1932 |
| 1,928,029 | Peterson | Sept. 26, 1933 |
| 2,100,566 | Munding | Nov. 30, 1937 |
| 2,263,536 | Dike | Nov. 18, 1941 |
| 2,323,587 | Duffy | July 6, 1943 |
| 2,345,469 | Dugaw | Mar. 28, 1944 |
| 2,536,665 | Skoog | Jan. 2, 1951 |